Oct. 8, 1940. C. EMMEY 2,217,199
APPARATUS FOR APPLYING THERMOPLASTIC TAPE LAYERS ONTO A BASE
Filed Nov. 22, 1937 3 Sheets-Sheet 1

INVENTOR.
Charles Emmey
BY Joseph F. Padlon
ATTORNEY.

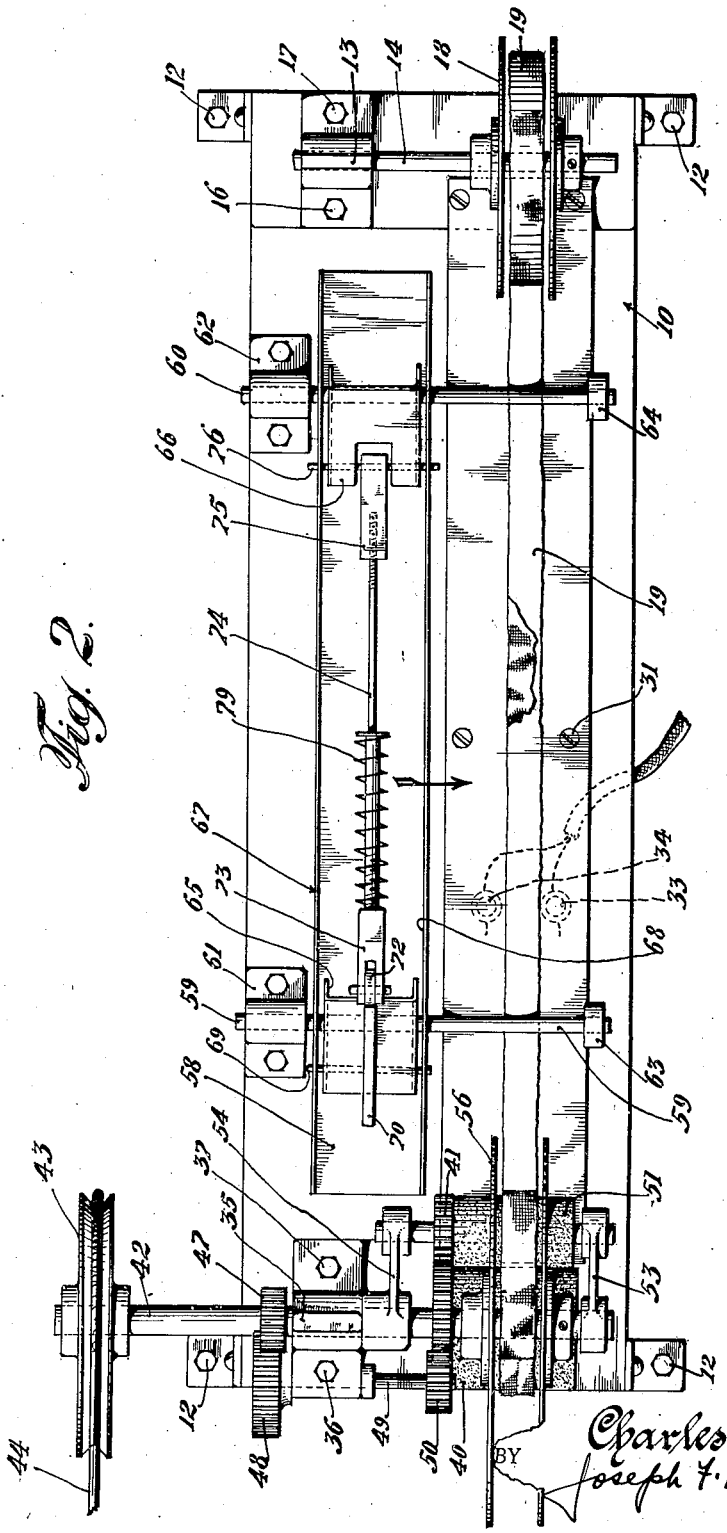

Oct. 8, 1940.  C. EMMEY  2,217,199
APPARATUS FOR APPLYING THERMOPLASTIC TAPE LAYERS ONTO A BASE
Filed Nov. 22, 1937  3 Sheets-Sheet 3
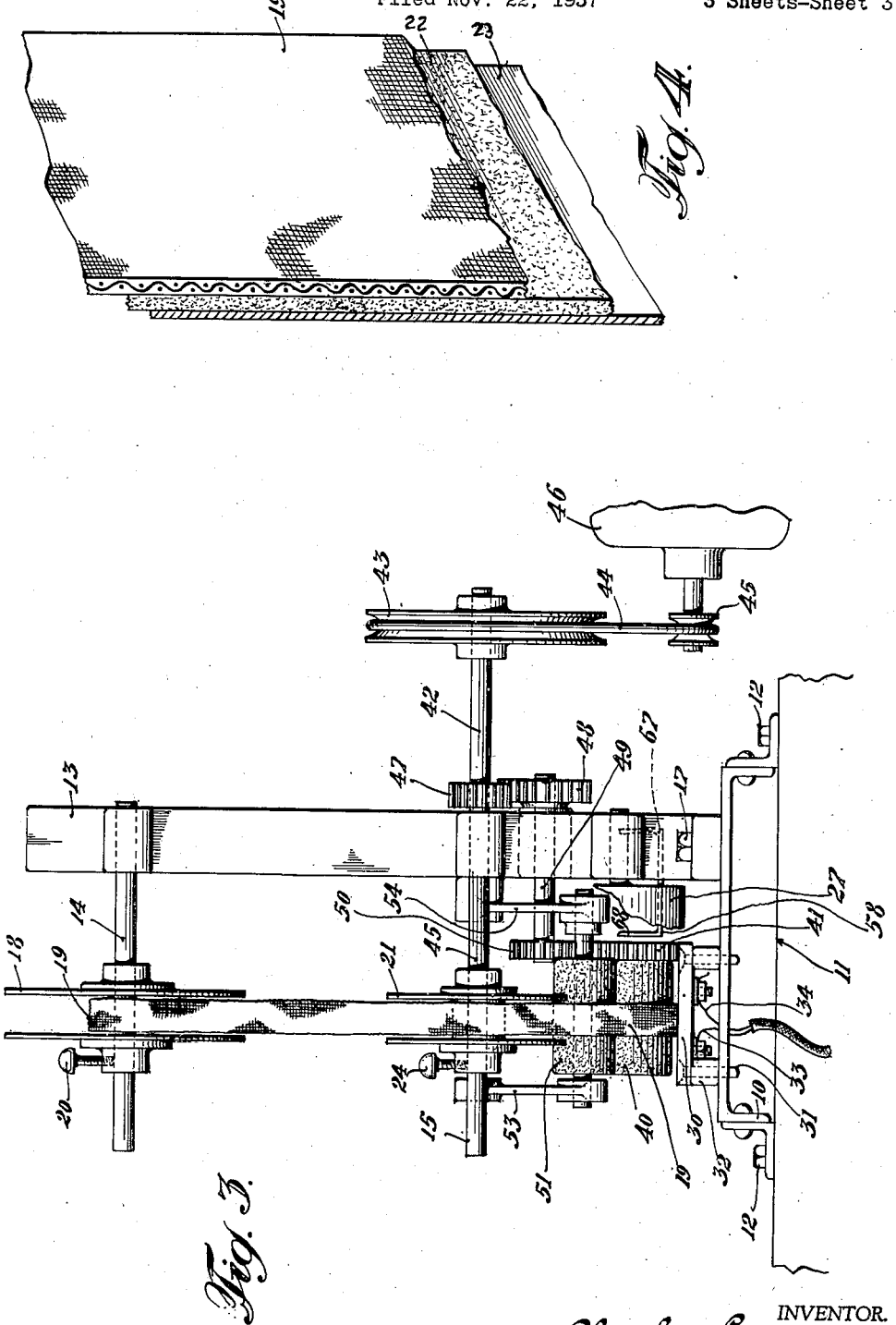
INVENTOR.
Charles Emmey
BY Joseph F. Padlon
ATTORNEY.

Patented Oct. 8, 1940

2,217,199

UNITED STATES PATENT OFFICE 2,217,199

APPARATUS FOR APPLYING THERMO-
PLASTIC TAPE LAYERS ONTO A BASE

Charles Emmey, New York, N. Y.

Application November 22, 1937, Serial No. 175,900

10 Claims. (Cl. 154—1)

The present invention relates to apparatus for applying thermoplastic tape layers onto a receptive surface and also to a product thereof. More particularly, the present invention relates to apparatus for continuously applying a layer of cementing tape onto a receptive base, while simultaneously heating the same, and to a product of said apparatus.

Labels used generally in the clothing industry, showing a mark or other identifying characteristic of ownership or origin of goods are usually applied onto the linings of coats, hats, shirts, underwear, towels and the like either by sewing or by embroidering. In time the stitching loosens or becomes easily worn and the label is lost. Furthermore, considerable expense and time are entailed in sewing such labels onto such goods, thereby increasing the cost of manufacturing and selling such materials.

With the above and other disadvantages in view, it is one of the objects of the present invention to provide novel and simply constructed apparatus for applying by suitable heating and tension, a heated cement tape onto a receptive surface.

One other object of the present invention is to provide a simply constructed device for continuously affixing a thermoplastic cement film onto the backing of a receptive surface while simultaneously heating and conveying the film and the surface.

Still another object of the present invention is to provide novel, easily operable and movable apparatus adapted to join a thermoplastic cement tape to a fabric or other suitable base for attaching the base fabric onto another fabric for use as an identifying mark or characteristic.

One further object of the present invention is to provide easily operable apparatus forming a novel combination for joining a thermoplastic cementitious film to a receptive base of suitable material and having suitable heating and drawing means for obtaining a resultant laminated product adapted for use in connection with textiles and like materials.

Other objects and features of the present invention will become apparent from the following detailed description taken in connection with the accompanying drawings showing a preferred embodiment thereof.

In the drawings:

Fig. 2 is a plan view showing the relative arrangement of parts preparatory to operation, Fig. 3 is an end view of the embodiment taken on line 3—3 of Fig. 1, and looking in the direction of the arrows, thereof, and Fig. 4 is an exaggerated fragmental view of a product formed according to the invention herein described.

Figure 1:
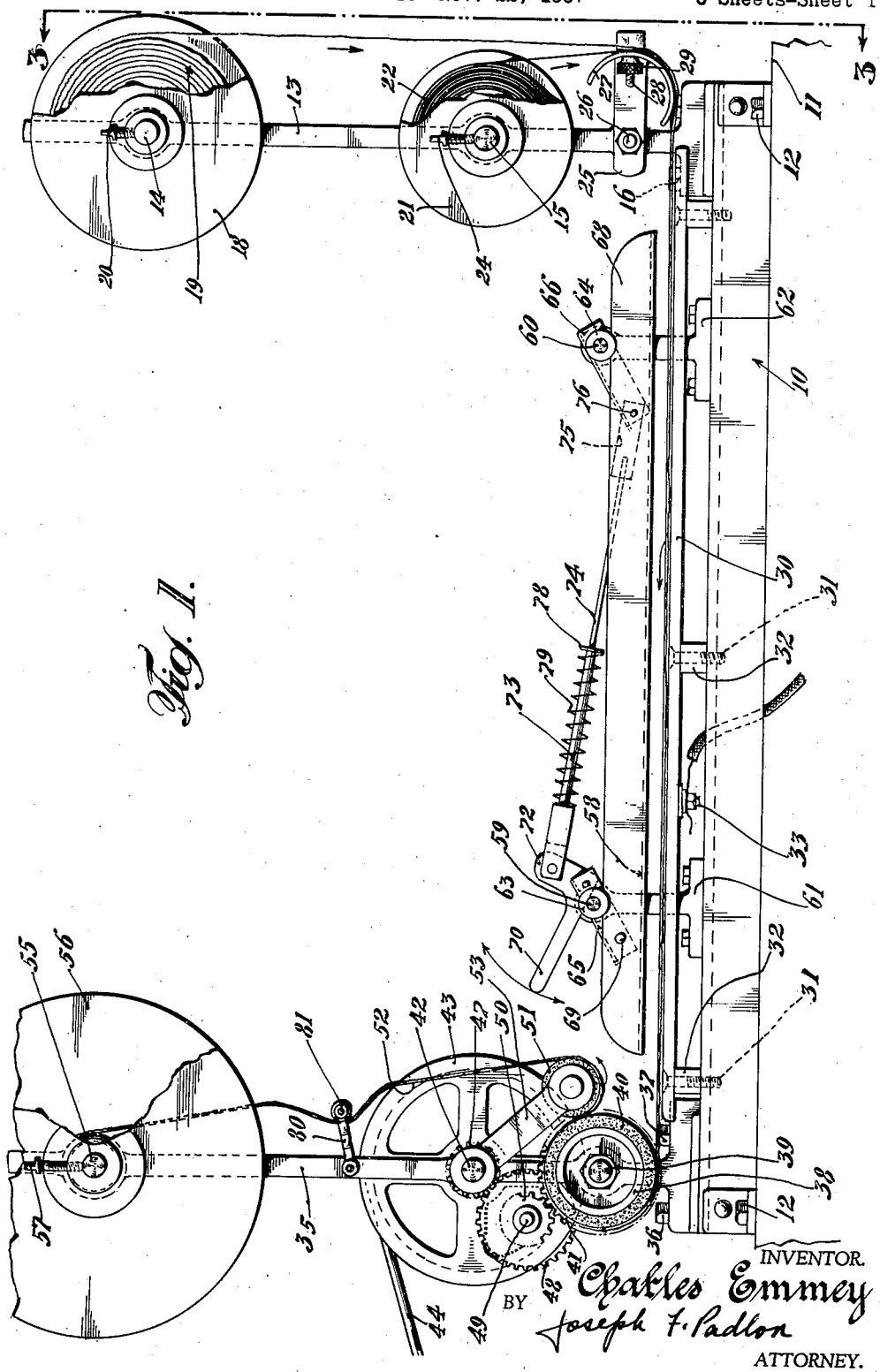
Fig. 1 is a front elevation of a preferred embodiment of my invention.

Referring to the drawings in which similar reference characters represent like parts thruout, a frame 10 is provided which may be mounted on any suitable base 11 such as a table, platform or the like and held in position thereon by bolt, screw members 12 disposed at spaced intervals alongside the edge of frame 10 as shown and extending into the base. Said frame may be of any suitable length or width and is preferably made of metal.

Extending upward at one end portion of frame 10 is a supporting member 13 onto which are journalled parallel shaft members 14 and 15 at spaced intervals thereon. Said supporting member may be integral with the frame or may be an easily attachable strut adapted to serve the purpose for which intended. The member 13 is retained in fixed position on frame 10 by means of a pair of screw bolts 16 and 17 respectively each extending thru the opposite edges of the adjacent end of the member into frame 10. It is to be noted that the shaft members are substantially free of friction and can easily be rotated.

Shaft member 14 extends over the frame 10 and is adapted to retain a roller 18 onto which is wound a tape 19 of suitable receptive material. Said roller 18 is provided with a set screw 20 extending thru one side of the roller to make contact with shaft member 14 and remain fixed thereto. Shaft member 15 is also provided with a roller 21 adapted to carry a roll of thermoplastic tape 22 having a covering of waxed paper 23 or like material of corresponding width. It is to be noted that said roller 21 is also provided with a set screw 24 adapted to retain the roller in fixed position on the shaft.

It is to be noted that the rolls are in parallel position whereby the strip of fabric, thermoplastic material and waxed paper are superimposed over each other as shown in Fig. 4 of the drawings preparatory to treatment.

Disposed under shaft 15 is an L shaped angle bar 25 fixed to member 13 by a bolt and screw 26. A curved guide plate 27 is mounted onto the short arm of bar 25 extending over the frame 10. Said plate is also adjustable thereon by means of threaded screw 28, extending from the guide plate 27 and nut 29.

Fixed to frame 10 is a hot plate 30 which extends along a major portion of the length of the frame. Said plate 30 is retained in position on the frame by means of a plurality of screws 31 disposed at spaced desired intervals along the marginal edges of the plate. It is to be noted that the plate is of a width preferably less than that of the frame and may be of any highly polished metallic surface. Furthermore, intermediate the frame and base plate is a plurality of collars 32 for keeping the plate in raised position on the frame. Said collars are made preferably of insulating material and accommodate the screws 31. The hot plate 30 is provided with an electrical heating unit which is in connection with a source of electricity by means of conductors 33 and 34 on the under side of said plate. It is to be noted that plate 30 may be heated along its entire length to any desired temperature depending upon the degree of heat necessary to weld the receptive material and thermoplastic tape as will be hereinafter described.

At the other end of frame 10 is another vertically extending supporting member 35 fixed thereto by means of bolts 36 and 37, respectively. Said member 35 is parallel with supporting member 13 and is disposed at the opposite end of the frame, whereby plate 30 is disposed intermediate said members.

Supporting member 35 is provided with a cylinder 38 whose shaft 39 is journalled thereto. Said cylinder is disposed on the shaft so as to have part of its periphery in line with the surface of plate 30 as shown in Fig. 1 of the drawings.

Cylinder 38 is provided with a surface of resilient material 40. It is to be noted that cylinder 38 is provided with a geared peripheral extension 41. Said support 35 is further provided with a drive shaft 42 onto one end of which is a pulley wheel 43 for accommodating drive belt 44 in connection with a shaft 45 of drive motor 46. Set in from the wheel 43 is a small drive gear 47 on shaft 45 for connection with a gear 48 which is mounted on an idling shaft 49. The other end of said shaft 49 is provided with a gear 50 in engagement with gear 41 of cylinder 38 for actuating the same.

Adapted to contact cylinder 38 is a friction cylinder 51 for retaining resultant tape 52 under tension when the device is in operation. It is to be noted that cylinder 51 rotates counter to cylinder 38 and is provided with arms 53 and 54 extending perpendicularly from the center of said cylinder. Said arms are journalled to shaft 45 to permit swinging of the cylinder 51 thereon prior to adjustment of tape 52 on cylinders 38 and 51.

Support 35 is further provided with a shaft member 55 journalled thereto and extending at right angles therefrom. The shaft member has a collecting roller 56 fixed thereto by means of a set screw 57 disposed in one of the faces of the roller and making contact with shaft 55.

It is to be noted that when motor 46 is in operation the receptive material 19, thermoplastic tape 22, and waxed paper 23 are in overlay position under tension as shown in Fig. 4, and guided onto plate 30 by means of guide 27 and cylinder 38 to form a resultant tape 52 in which the cloth and thermoplastic tape are fused together while being drawn over plate 30.

In order to retain the overlay tape, cloth and paper in relatively superposed flat position on plate 30, while being drawn along thereon, there is provided an overlay platform 58 of channeled metal slidably mounted on a plurality of guide shafts 59 and 60. Said shafts are fixed at one end to frame 10 by means of upright members 61 and 62 respectively, upwardly extending from the frame. It is to be noted that said guide shafts are of sufficient length to extend the width of said frame 10 to permit proper positioning of the platform. Said shafts 59 and 60 are furthermore provided at one end with stop collars 63 and 64 for properly fitting platform 58 over plate 30.

Said platform 58 is provided with a pair of channel bars 65 and 66 respectively, pivotally mounted intermediate the vertical walls 67 and 68 respectively of the platform onto shafts 59 and 60 respectively. Channel bar 65 is pivoted to platform walls 67 and 68 by means of a pivot rod 69 and has pivotally connected an L shaped member 70.

Said handle 70 is pivotally connected to the channel bar at the intersection of the long and short arms 71 and 72 respectively, while the end of the short arm 72 is in pivotal connection with a collar rod 73. Interconnecting rod 73 and channel bar 66 are an adjustable shaft member 74 and an extension block 75 which in turn is pivoted to a pin 76. Said channel bar 66 is pivoted to the walls 67 and 68 of platform 58 by means of pin 76.

Collar rod 73 is provided with a stop 78 for retaining a spring 79 under tension on the rod. It is to be noted that shaft 74 is adjustable relatively of rod 73 to obtain the proper tension of spring 79. It is to be further noted that the handle 70 when operated performs a toggle action whereby platform 58 may be lowered directly over plate 30 or raised when the device is in operation.

Supporting member 35 is further provided intermediate gear roller 56 and shaft 42 with an extension rod 80 having a cross member 81 for keeping tape 52 under tension after it passes cylinder 51 and also to prevent said cylinder from being raised out of position as shown in Fig. 1.

In the operation of the presently disclosed preferred embodiment, a roll of cloth 19 or any other suitable material of any suitable width adapted for adhesion is brought into position with another roll containing a thermoplastic cement tape 22 and a "glassine" or impervious paper 23, forming a triple layered product or tape 52 as shown in Fig. 4. Said multi-layered tape is then passed over a space, sufficiently large therefor without preventing movement of the same, formed by the heated plate 30 and overlaying platform 58. As said layers pass over the plate the cement tape 22 becomes sufficiently soft to penetrate the layer of material 19 under pressure and form a film thereon. By the time said layers reach the end of the plate the tape 22 and material 19 are sufficiently welded to permit rolling, whereupon they pass over cylinder 40 then equalizing cylinder 51 over cross member 81 and onto roller 56. It is to be noted that the paper strip 23 may be either removed before resultant tape 52 is collected on roller 56 or it may be rolled thereon to prevent the film of cement tape 22 from adhering to the uncoated surface of the receptive material 19.

By the present invention a continuous operation of adhering a film of thermoplastic cementitious material onto a receptive surface is effected. The width of the rolls, of the heated plate, of the cylinders and platform may be of any desirable width without departing from the spirit of the invention. Furthermore, by the cooperation of the guide plate 27, plate 30, platform 58, cylinders 40 and 51 and cross member 81 there is no crumpling or wrinkling of surfaces during the adhesion operation. A product obtained as shown in Fig. 4 is adapted for use on labels, cloth, paper or other suitable receptive material to form an interlining or covering with other desirable materials.

While one preferred embodiment of the present invention has been described in detail in connection with the accompanying drawings, it is understood and to be noted that various changes as to form, use of materials and arrangement of parts may be made without departing from the spirit and scope of the present invention as set forth in the appended claims.

I claim:

1. Apparatus for continuously joining a thermoplastic tape to a fabric tape backing comprising a base frame, a base, means for dry heating said base, slidable actuable means adapted to cover the base forming a relatively small clearance therewith, actuable rotatable means for drawing superposed layers of cementitious tape and fabric tape over the platform through said clearance to permit adhesion of the tapes by the heating means, and rotatable means in connection with the base for winding the resultant welded tape.

2. Apparatus for continuously heating and joining a cementitious film to a fabric backing, comprising a frame support, a base mounted on said support, electrical heating means for said base, a manually operable slidable member mounted on the frame adapted to form a clearance space with the base, rotatable, driven means mounted on the frame and in line with the base for horizontally drawing the film and tape in superposed position thru the heated clearance space and permit joining of the same together, and roll means for manually winding the joined film and tape into a roll.

3. Apparatus according to claim 2, in which the electrical heating means is disposed under the base, and the slidable member is adapted to be drawn over the base and depressed into overlaying position therewith forming a clearance therebetween sufficient to permit the passage of a plurality of superposed strips therethrough.

4. Apparatus for joining a cementitious thermoplastic film onto a receptive base comprising a frame, a hot plate supported by said frame, means vertically extending from the frame for carrying a plurality of rolls of materials adapted to be adhered together, a guide plate extending from the means for lining the superposed layers of said materials onto the hot plate, a resilient drawing cylinder disposed at one end of the frame for horizontally drawing the superposed layers across the hot plate to permit joining of the film to the base, vertically extending means on the frame for said cylinder means in connection with the cylinder for actuating the same, an equalizing cylinder forming frictional contact with the drawing cylinder and rotating counter thereto adapted to retain the superposed layers of material on the drawing cylinder, a roller on the vertically extending means for winding the joined film and base, and a rod member on said extending means intermediate the cylinders and the roller for guiding the material onto the roller and retaining the equalizing cylinder in frictional abutment against the drawing cylinder.

5. Apparatus according to claim 4, in which the guide plate is curved and adjustable relatively of the hot plate and a slidable member is provided on the frame adapted to cover the hot plate forming a clearance with said hot plate and permit passage of the superposed materials therethru and joining of the same.

6. Apparatus for applying a thermoplastic layer onto a receptive base, comprising a frame, raised heating means mounted on the frame for joining a layer of receptive material, and a thermoplastic film having non-absorbent waxed paper together, a manually operable raised member mounted on said frame adapted to be slid over said heating means and lowered thereagainst forming a clearance with the heating means and press, said layers against said heating means, a geared rotatable frictional member mounted on the frame for drawing said layers away from the heating means, a manually adjustable tensioned cylindrical member rotatable counter to said frictional member adapted to form peripheral friction therewith and carry said layers away therefrom, and means mounted on said frame and in alignment with the frictional member for collecting the resultant joined layers.

7. Apparatus for applying a thermoplastic layer onto a receptive base according to claim 6, including a vertical member extending from one end of said frame for supporting a plurality of rollers therefrom carrying respective strips of joinable materials, said rollers being axially parallel relatively of each other on said member, and a curved adjustable guide plate on said member part of whose curvature is disposed in a plane substantially in alignment with said heating means.

8. Apparatus for applying a thermoplastic layer onto a receptive base, comprising a frame, a heating unit mounted on the frame, a raised member mounted on said frame disposed over the heating unit adapted to be slid directly over and depressed downward toward the heating unit forming a clearance therewith, a vertical shaft on the frame, an actuable drawing cylinder, having a resilient surface having part of its surface in alignment with the surface of said heating unit, adapted to draw a plurality of joinable layers of strip material horizontally over the heating unit through the clearance thereof and join them together, drive means in connection with said cylinder, a tension frictioning cylinder for taking up the welded materials from the first cylinder, and means extending from the frame for taking up the slack in the welded materials to permit winding thereof.

9. Apparatus for applying a thermoplastic layer onto a receptive surface, comprising a frame, a horizontal hot plate mounted on said frame having a connection for a source of heat energy, a member in connection with the frame disposed in a plane above the hot plate, a plurality of means extending from the frame for carrying said member and permit sliding of the same over the hot plate, manually operable means in connection with said first member for lowering the same over said hot plate and form a clearance therewith, supporting means extending from one end of the frame carrying a roll of receptive material and a thermoplastic layer respectively, rotary means at the other end of the frame adapted to frictionally engage said material and layer and draw them horizontally through the clearance over the hot plate for joining them, a counter rotary frictioning member contacting said rotary means for guiding the resultant heated material away from said rotary means, and driving means in connection with the rotary means for actuating the same.

10. Apparatus for continuously joining a thermoplastic tape to a receptive strip, comprising a base, means for dry heating said base, adjustable means disposed laterally above said base adapted to be placed in spaced relative position above said base forming an intermediate horizontal clearance therebetween, driven rotatable resilient means mounted on the base adapted to simultaneously draw the tape and strip through the horizontal space and permit adhesion of the tape to the strip by the heating means, and tensioned counter rotary means contacting the rotatable means for continuously pressing the tape and strip together.

CHARLES EMMEY.